United States Patent [19]
Shy

[11] Patent Number: 5,550,718
[45] Date of Patent: Aug. 27, 1996

[54] THIRD BRAKE LIGHT FOR AUTOMOBILES

[76] Inventor: Jack Shy, Suite 1, 11F, No. 95-8, Chang Ping Rd., Sec. 1, Taichung, Taiwan

[21] Appl. No.: 202,376

[22] Filed: Feb. 28, 1994

[51] Int. Cl.$^6$ .................................................. B60Q 1/26
[52] U.S. Cl. ........................... 362/80.1; 362/80; 362/375
[58] Field of Search ............................. 362/80.1, 61, 80, 362/374, 375; 340/479

[56] References Cited

U.S. PATENT DOCUMENTS 4,654,757  3/1987  Birkhauser ........................... 362/80.1
4,937,712  6/1990  Caffin et al. ........................... 362/80.1

Primary Examiner—Stephen F. Husar

[57] ABSTRACT

A third brake light attachable to behind the rear windshield of an automobile which comprises generally a lamp shade having a visor and reflector on the fore side, an opening on a corner of an arcuate rear housing and a lug means on the bottom for pivotally securing to a roughly cone shaped stand and a cover for removably closing the opening having an attachment member thereof for the disposition of a lamp receptacle therein. The improvement of this disclosure has been characterized in the releasable structure of the removable components thereof and the removable cover in particular that facilitates a ready replacement of a electric bulb from therein when the bulb is burned out.

4 Claims, 3 Drawing Sheets 5,550,718

THIRD BRAKE LIGHT FOR AUTOMOBILES

BACKGROUND OF THE INVENTION

The present invention relates to automobile apparatus, more articularly to a third brake light attachable to a position behind a rear windshield of an automobile, which brake light has an improved structure of a removable lamp receptacle member thereof being accessible for the ready replacement of an electric bulb therein when the bulb is burned out.

For the enhancement of the traffic security, a third brake light has been specified to attach behind the rear windshield of an automobile since few years ago in order that the light is more visible by the cars following behind, the original structure of this third brake light is very simple and clumsy, it most likely has a lamp shade enclosed by a red colored reflector, a built-in lamp socket with an incandescent electric bulb secured therein and a bracket or stand in communication with electric power connected to the bottom thereof. People have always been suffered on changing a bulb therein when it is burned out because they find the reflector on the lamp shade of this type is fixed and non removable. So that the light has to be removed as a whole and disassembled by an artisan in a garage, causing inconvenience and additional expense for them.

SUMMARY OF THE PRESENT INVENTION

The present invention has a main object to provide a structurally improved third brake light in which a releasable lamp receptacle member attached to a removable portion of the light so as to facilitate an accessible replacement of the electric bulb therein.

Accordingly, the third brake light of the present invention comprises a lamp shade generally in rectangular form having a flat reflector in red color snap engaged with a visor thereof and a rectangular opening formed on a corner of an arcuate rear wall thereof, an arcuate rectangular cover having a pull means on one lateral side, a pair of spaced snap tabs on each lateral side and a small platform on bottom with attachment member thereon for the disposition of an electric socket therein. Since an interior arcuate compartment formed inside the shade abutting the arcuate opening, having a pair of retaining recesses on a first lateral side, an alongate slot on a second lateral side and a circular passage thereof at proper position of the compartment beside the recesses, the cover can be readily and releasably connected with the arcuate opening in a snap fitting.

The shade further has a lug member on the bottom pivatally secured to a cone shaped stand which is screw fixed onto a planar place behind the rear windshield of an automobile.

The present invention will be more fully understood by reference to the following detailed description thereof when read in conjunction with the attached drawings.

DETAIL DESCRIPTION OF THE PREFERRED EMBODIMENT OF THE PRESENT INVENTION

Figure 1:
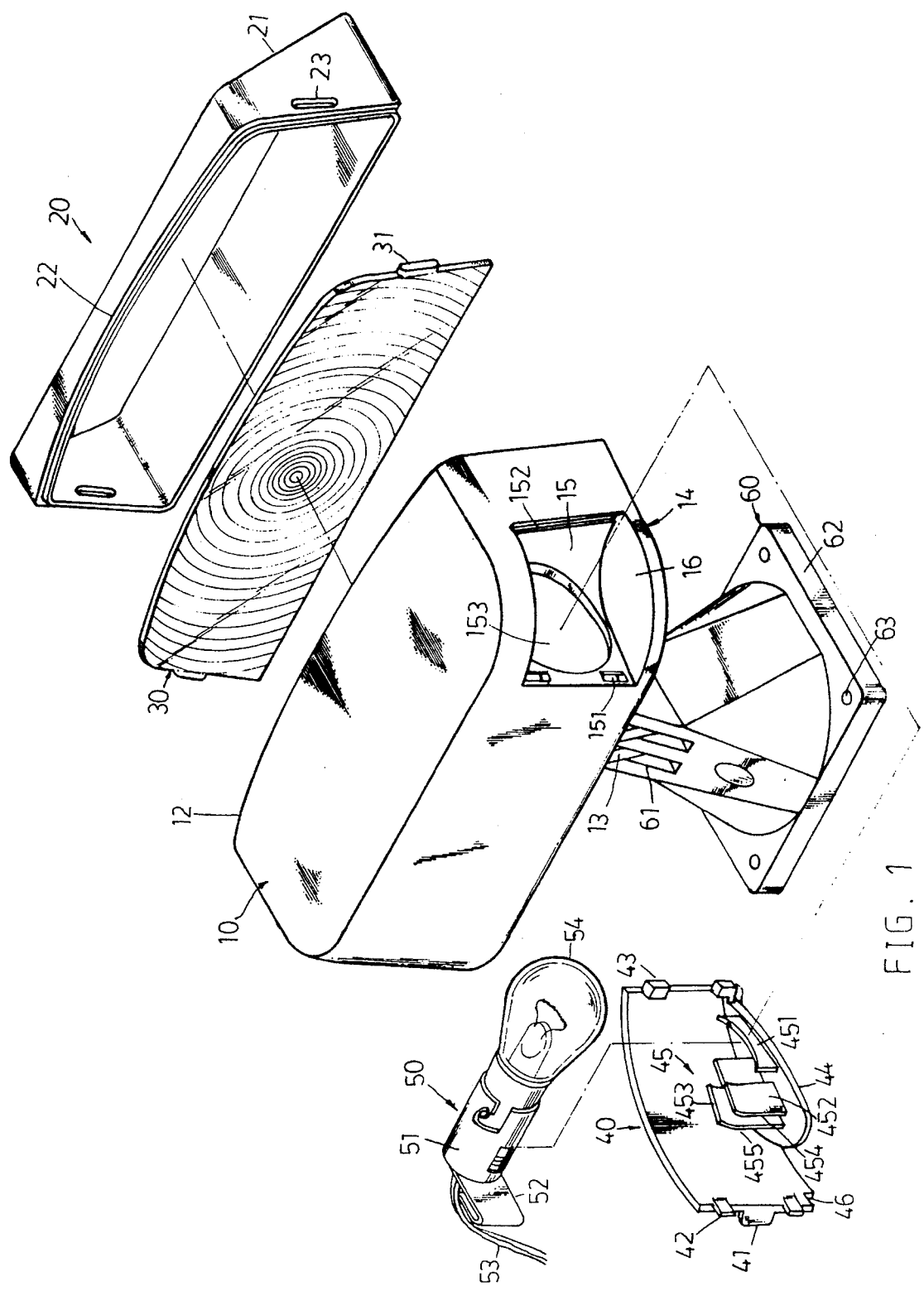
FIG. 1 is an exploded perspective view to show a preferred embodiment of the present invention.

Referring to FIG. 1, the present invention of a third brake light located behind the windshield of an automobile comprises a generally rectangular lamp shade 10 having an upper wall and a lower wall connected by an arcuate wall therebetween to define a lamp chamber therein and a fore opening, the chamber has been internally laminated with reflective material 11, an elongate fillister 12 formed around the interior surface of the walls adjacent the fore edge thereof a lug member 13 having axle apertures 131 thereon (not shown) extended downward at appropriate center of the bottom therefrom and an arcuate rectangular opening 14 thereof on a corner of the rear arcuate wall, a roughly rectangular visor 20 made of flexible material having a sloped fore edge 21, an elongate fillet 22 formed around on the outer surface adjacent the rectangular rear edge thereof and a retaining slot 23 at each of the side walls adjacent the rear edge for snap fitting a red color reflector 30 which is in rectangular form has a snap tab 31 thereof on each of the lateral sides made in registry with the retaining slots 23 and a size in conforming with the interior dimension of the visor 20, an arcuate rectangular cover 40 being arcuate as the shape as the opening 14 having a purl means 41, a pair of snap tabs 42 and a recess 45 on one lateral side, a pair of spaced retaining tabs 43 on each of the lateral sides and a roughly oval shaped platform 44 thereof abutting on one side to the bottom of the arcuate wall with an attachment member 45 thereon being disposed a lamp receptacle member 50 therein, and a roughly cone shaped stand 60 having a pair of vertical slots 61 with transverse axle apertures 611 thereon (not shown) and a rectangular base seat 62 on the bottom with vertical screw holes 53 on each corner thereof.

An interior arcuate compartment 15 is formed inside the housing of the shade 10 abutting the arcuate rectangular opening 14 to define a roughly sector receiving space 16 therein. The compartment 15 has at first end a pair of spaced retaining recesses 151, the second end a vertical slot 152 and a circular passage 153 on the compartment, adjacent the recesses 151. Where, the attachment member 45 on the platform 44 of the cover 40 has a carriage means 451 abutted to the edge and a pair of spaced vertical plates 452 and 453 in different form and size adjacent the inner wall of the cover 40 to define a pair of slits 454 and 455 therein between for the disposition therein of the above cited lamp receptacle member 50 which has a cylindrical socket 51 with a flat inversely bent, transverse retainer 52 together with a pair of lead-in wires 53 connected to the rear end thereof and a bayonet electric bulb 54 engaged with the fore end therein. The socket 51 releasably disposes to the attachment 45 in the manner such that forcibly insert the inverse portion of the retainer 52 into the slit 454 so as to have the socket 51 stopped against the arcuate upper edge of the carriage 451 and the ires 53 clamped on by the slit 455 therein.

Figure 2:
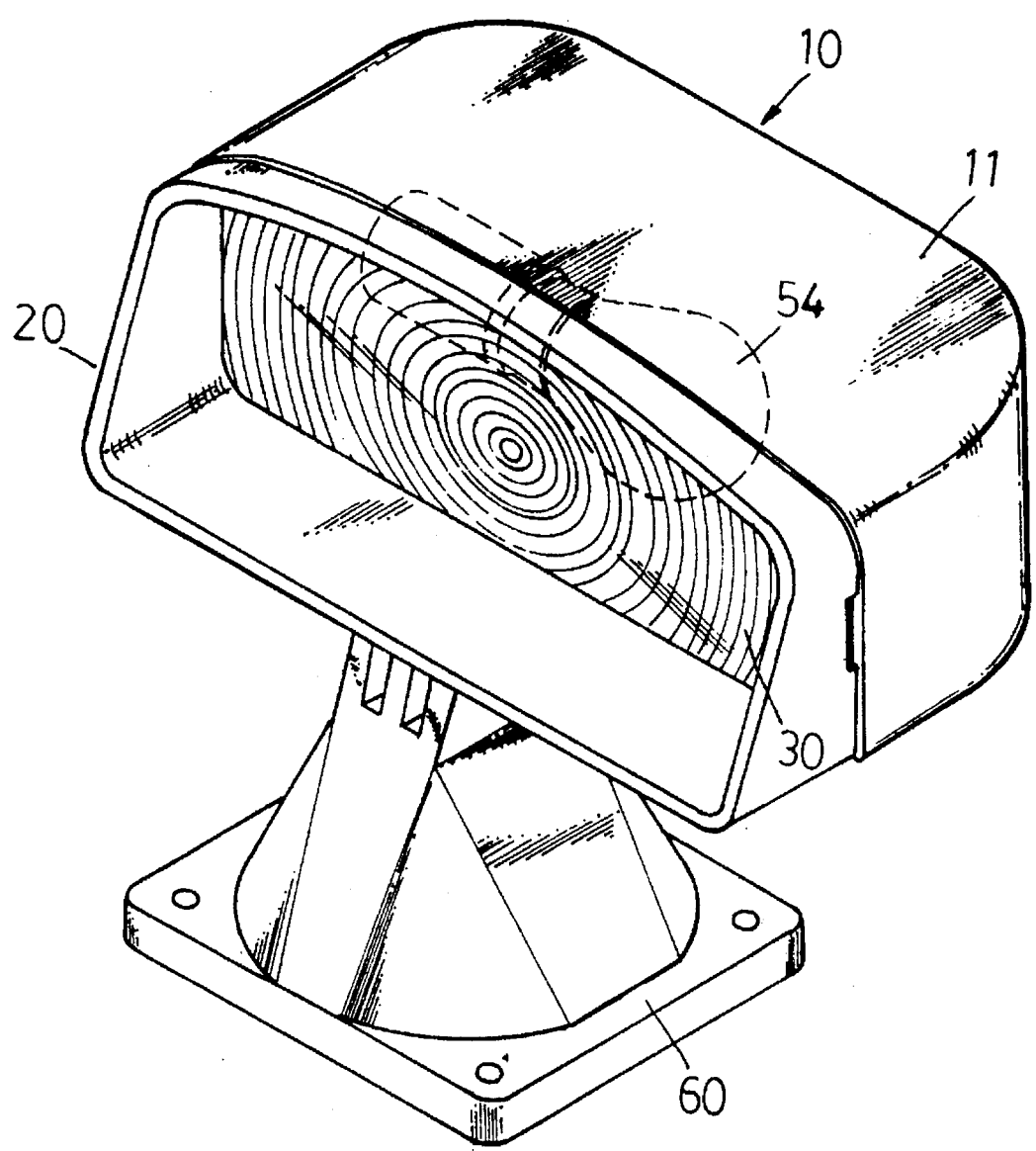
FIG. 2 is a perspective vie to show an assembled version of the preferred embodiment according to the present invention.

Referring to FIG. 2, the assembly of the brake light is such that firstly fixing the red color reflector 30 onto the visor 20 by the engagement of the snap tabs 31 thereof with the retaining slots 23 and secondly, forcible insertion the visor 20 onto the lamp shade 10 by the engagement of the fillet 22 thereof with the fillister 12 of the lamp shade 10 therein, both in a manner of snap fitting, then, inserting the pair of the retaining tabs 43 on the cover 40 into the pair of the corresponding retaining recesses 151 in the opening 14 to have the electric bulb 52 passing through the passage 153 therein and pressing the pull means 41 to close the cover 40 so as to have the snap tabs 42 thereof elastically engaged with the vertical slot 152 therein and the lead-in wires 53 stretched out via the recess 46. The bulb 54 will be positioned at a radial center of the shade 10 therein.

Finally, is the securement of the shade 10 as a wholeonto the cone shaped stand 60 by the engagement of the lug 13 into the vertical slots 61 on the top of the stand 60 and pivotally fixed with a threaded pin which is fastened in such tension that the shade 10 is to press rotate on the stand for an adjustment of the beamish direction.

Figure 3:
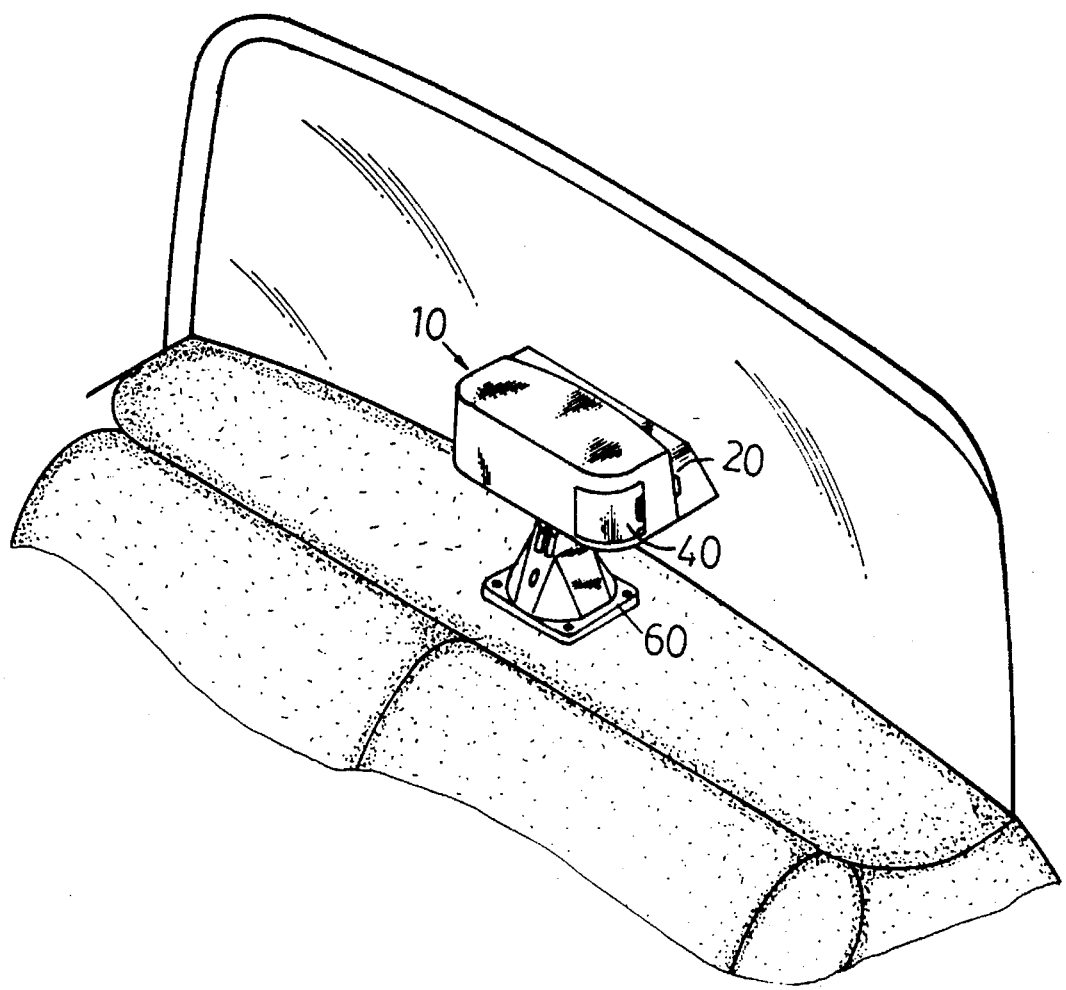
FIG. 3 is a perspective view to show a third brake light of the FIG. 2 being installed behind the rear windshield of an automobile.

Referring to FIG. 3 of a perspective view shows a third brake light of the present invention being secured to a planar place between the back chairs and the rear windshield of an automobile. Actually, the light is displaceable if necessary.

Based on aforediscussed improvement, the third brack light of the present invention provides numerous features and advantages outlined as follows:

a) all the components thereof are removable for facilitating a ready assembly or disassembly, b) a lamp member attached to a removable cover on the arcuate rear wall of the shade facilitates a ready replacement of an electric bulb from therein, and c) a beautified outer appearance provides a cosmetic effect to the customers.

The scope of this invention should be determined by the appended claims and their legal equivalents rather than by the example given in above description.

I claim:

1. A third brake light which is attachable to behind the rear windshield of an automobile comprising:

a generally rectangular lamp shade, said shade comprising an upper wall and a lower wall connected by an arcuate wall therebetween to define a lamp chamber and an opening on the fore side thereof, said walls being internally laminated with reflective material, an elongate fillister formed around the interior surface of said walls adjacent the edge of said opening, another opening formed on a corner of said arcuate wall and a lug means thereof extended downward at an appropriate center of the bottom of said chamber therefrom;

a visor connected to the fore side of said shade, said visor comprising a pair of triangular lateral walls connected by a narrower upper wall and a wider lower wall to define a four sided rectangular housing having a sloped fore side, a pair of retaining slots formed on said lateral walls respectively and an elongate fillet means formed around the outer surface adjacent a rectangular rear edge thereof in registry with said fillister of said shade;

a red color reflector, said reflector comprising a flat rectangular body and a pair of snap tabs thereof formed on lateral sides respectively in registry with said retaining slots of said visor;

an interior arcuate compartment abutting said opening of said arcuate wall to define a roughly sector receiving space thereinbetween, said compartment comprising on first end a pair of retaining recesses, the second end a vertical slot and a circular passage formed on said compartment adjacent said recesses;

an arcuate rectangular cover for removably closing said opening of said arcuate wall, said cover comprising on first lateral side a pair of snap tabs, a pull means and a recess, the second lateral side a pair of retaining tabs and a platform on the bottom which has a attachment member thereon for the releasably disposition therein of a lamp receptacle which includes a socket with an electric bulb, a pair of lead-in wires and an inversely bent retainer means thereof;

a roughly cone shaped stand member, said stand member comprising vertical slots which is made in registry with said lug of said shade with axle recesses thereon at the top thereof for pivotal engagement with said lug therein by a threaded axle pin and a rectangular base seat having vertical screw apertures thereon for the disposition of said brake light onto an automobile by means of screws;

whereby, said removable cover facilitates a ready replacement of said electric bulb therefrom.

2. A third brake light according to claim 1, wherein said visor is made of flexible material.

3. A third brake light according to claim 1, wherein said attachment member on said platform of said cover comprises a carriage means, a pair of vertical plates in different form and size which are juxtaposed adjacent the inner wall of said cover for defining a pair of slits thereinbetween.

4. A third brake light according to claim 3, wherein said slits are adapted to respectively clamp said retainer means and said pair of lead-in wires of said receptacle therein.

* * * * *